INVENTOR.
Frederick Kraissl Jr.
BY
Bierman & Bierman
attorneys.

United States Patent Office 3,567,181
Patented Mar. 2, 1971

3,567,181
MEANS FOR FACILITATING THE ASSEMBLY
OF PLUG VALVES
Frederick Kraissl, Jr., 244 Kinderkamack Road,
North Hackensack, N.J. 07601
Filed Mar. 13, 1969, Ser. No. 806,857
Int. Cl. F16k 5/02
U.S. Cl. 251—309     2 Claims

ABSTRACT OF THE DISCLOSURE

A means for facilitating the assembly of plug valves wherein interfitting elements, adjustable relatively to one another, are provided on the plug and on a coverplate therefor to insure the correct assembly of the valve. In one embodiment, such elements comprise an arcuate groove or rescess of slightly greater length than a true quadrant provided in a face of the cover plate, and a pin on the valve plug entering the recess. An additional positioning means consists of a dowel pin entering the cover plate and valve housing.

In the servicing of plug valve assemblies it sometimes occurs that inexperienced personnel, attempting to assemble a valve of this kind, will reassemble the components thereof in such a manner that the ports through the plug will not properly align with the ports in the housing of the valve and as a result the valve will malfunction or be inoperative.

It is therefore an object of the present invention to provide means by which the above-mentioned possibility will be avoided and an accurate and proper assemblage of the parts of the valve will be speedily attained. There is accordingly provided, preferably in the underface of a valve cover plate, an arcuate or quadrant-shaped recess or groove, and preferably one longer than a true quadrant, and a pin located in the top of the plug of the valve enters said recess. There is also provided, as a fixed element, a dowel pin located in or provided on the cover plate and entering into the housing. The length of the arcuate recess is such that it permits the conventional rotative movement of the plug to be halted at the ends of its movement by means of the conventional valve stops, thus avoiding the use of the ends of the arcuate recess as stops and preventing the possible shearing off of the pin which enters said recess.

Figure 1:
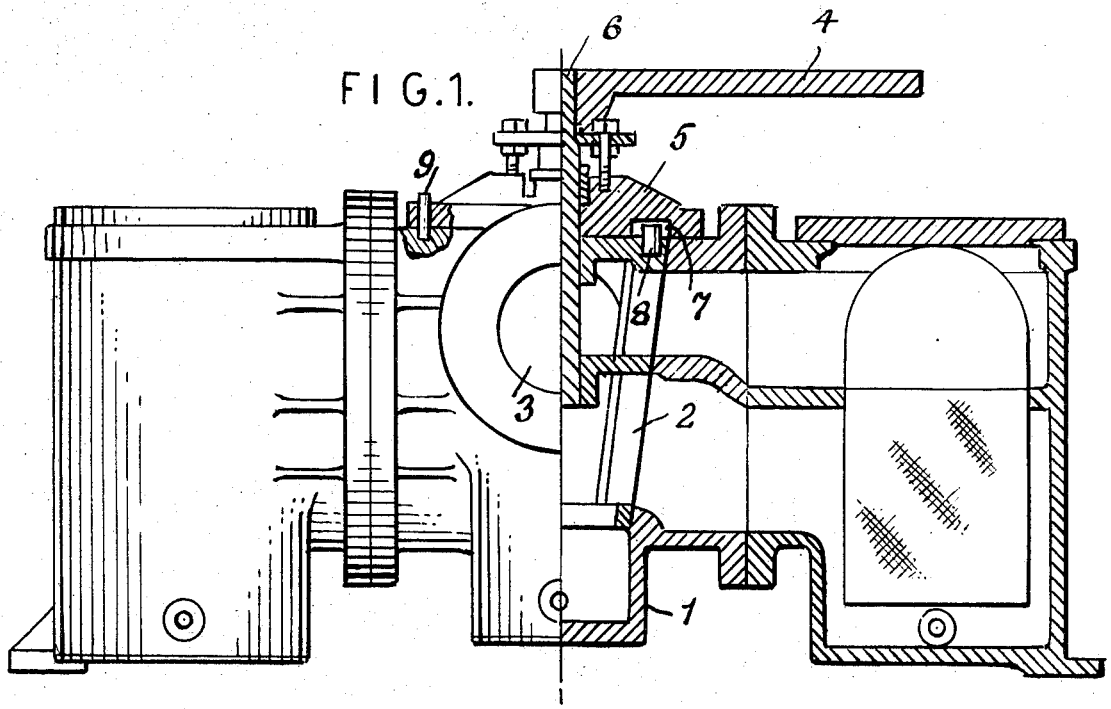
Figure 2:
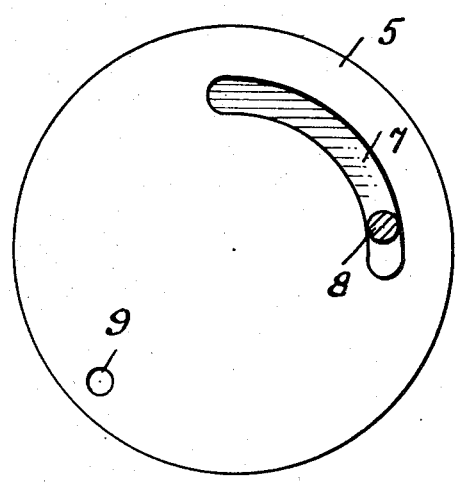

Referring to the accompanying drawing, wherein an illustrative embodiment of the invention is disclosed and in which:

FIG. 1 is a view of a valve arrangement for a filter, the same being shown partly in section and in which the present invention is embodied; and FIG. 2 is a view looking at the underside of the valve cover plate.

Referring to the drawing, 1 indicates generally the housing or body of a separator device including filters and strainers in which a valve arrangement embodying the subject matter of the present invention is disclosed. It may be pointed out that the subject matter of the invenion may be embodied in many types of plug valves and the invention is accordingly not limited to a specific embodiment in a valve arrangement of the type illustrated.

The plug of the valve is shown at 2 and the same is adapted to be rotatively moved in the conventional manner to a predetermined extent to register its ports with those extending through the housing, one of the latter ports being indicated at 3.

A handle 4 is provided for the rotation of the plug in the known manner. A cap or closure plate 5 is fitted on the housing over the larger end of the plug, the stem 6 of the valve extending through the cap and being attached to the valve plug 2.

Provided in the underface of the closure cap 5 is an arcuate recess or groove 7 which is of quandrantal shape and is preferably greater in length than a true quadrant. The top of the valve plug 2 is provided with an upwardly projecting pin 8 that enters into the groove 7. It will be noted that the recess 7 does not penetrate completely through the closure cap but extends only partly through is so that when the cap is fitted on the housing over the larger end of the valve plug, both the recess 7 and the pin 8 which enters into it, are covered, concealed, and rendered tight against fluid leakage.

At 9 is shown a dowel pin which is carried by the closure cap and the same enters an aperture in the housing when the closure cap is fitted in the proper position and the pin 8 is located in the arcuate slot 7. Since the arcuate recess is greater in length than a true quadrant, it does not limit the rotative movement of the plug by manipulation of the handle 4 and hence does not interfere with the conventional turning of the plug nor does it act as stops therefor, the conventional stops being used for that purpose. Hence no strain is placed upon the pin 8 and the possibility of the same being sheared off by the turning of the plug is thus avoided.

While an arrangement is suggested in which an arcuate recess is provided in the underface of the cover plate or cap, with a pin fixed in the plug and projecting into the recess, it will be apparent that this arrangement might be reversed and the pin provided on the bottom of the cover plate or cap, to enter an arcuate recess provided in the top of the valve plug. It is also appreciated that a protruding portion of the cover plate might be provided with a vacant segment corresponding, at least in function, to the described quadrantal recess. These and other modifications are considered as being within the scope of the claims appended hereto.

While I have illustrated the improved arrangement as being applied to a plug valve of a certain type, it will be apparent that the arrangement can be applied to other plug valves whether they are separate units or are cast as an integral part of the housing of a duplex separator or as a valve center of a three-piece duplex separator.

The arrangement described is such that by the placement of the pin 8 in the arcuate recess 7 and by the entry of the dowel pin 9 in an accommodating recess in the housing, misaasembly of the valve will be prevented and this will insure a proper directional assembly when the parts are disposed in the manner set forth herein.

What is claimed is:

1. In a plug valve of the type having a housing with a plurality of ports therein, a rotatable plug having one or more ports selectively communicable with the ports in said housing and a cover for said plug, the improvement comprising first guide means associated with said cover and plug and second guide means associated with said cover and housing for locating the cover on said housing to locate the plug with respect to the housing, both said guide means assuring proper location of said plug in the housing, said first guide means comprising an arcuate recess and a pin relatively movable in said recess in response to rotation of said plug, the recess being placed in one of the valve parts associated with said first guide means and the pin on the other, said recess being longer than necessary to accommodate the pin throughout the total range of relative movement between the pin and recess such that the pin never contacts the ends of the recess, said second guide means properly locating said cover with respect to said housing, and in conjunction with said first means properly locating the plug with respect to the housing.

2. The apparatus specified in claim 1 wherein said arcuate recess is located in the said cover and facing said plug, said pin being mounted on the said plug and extending into said recess.

References Cited

UNITED STATES PATENTS

| | | | |
|---|---|---|---|
| 2,204,461 | 6/1940 | Zimarik | 137—625.47X |
| 2,593,527 | 4/1952 | Berck | 251—287X |
| 3,131,706 | 5/1964 | Harban | 137—625.47X |
| 3,353,785 | 11/1967 | Eggers | 251—287X |

FOREIGN PATENTS

| | | | |
|---|---|---|---|
| 923,647 | 2/1955 | Germany | 137—625.46 |
| 1,133,194 | 7/1962 | Germany | 137—625.46 |

M. CARY NELSON, Primary Examiner

M. O. STURM, Assistant Examiner

U.S. Cl. X.R.

251—287